Aug. 9, 1932.  G. H. KOCH  1,871,326
ARC WELDING MACHINE
Filed March 17, 1930   2 Sheets-Sheet 1
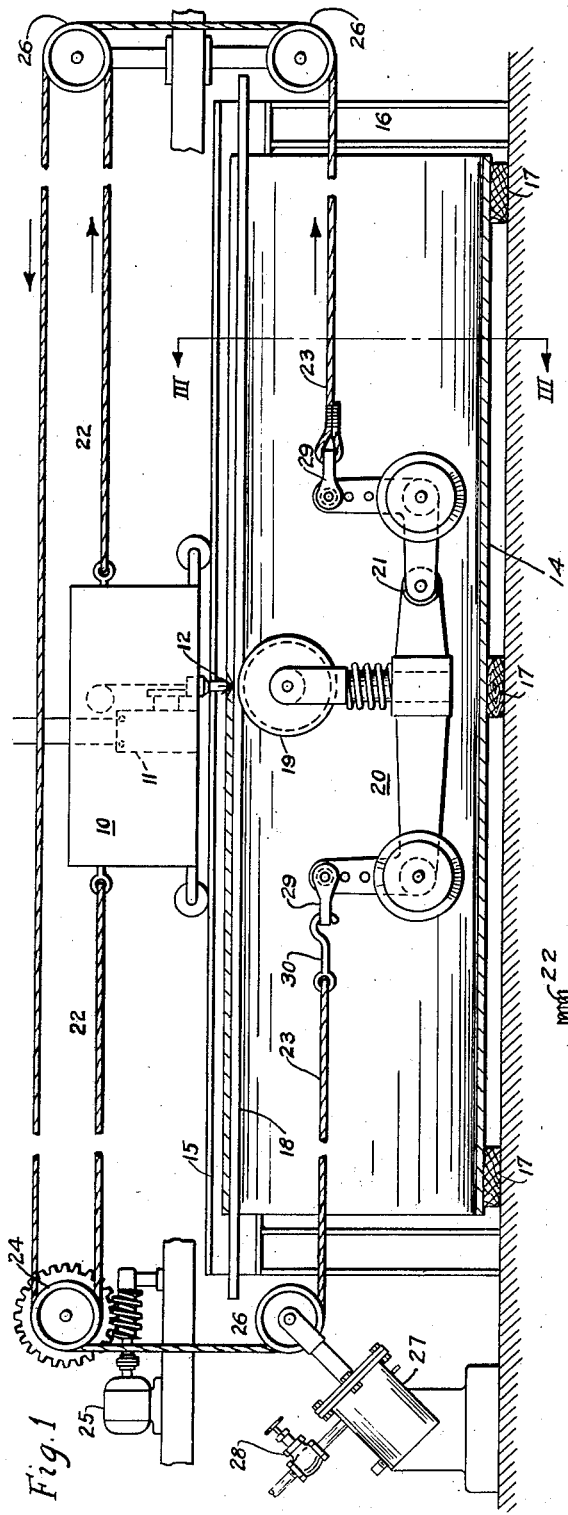
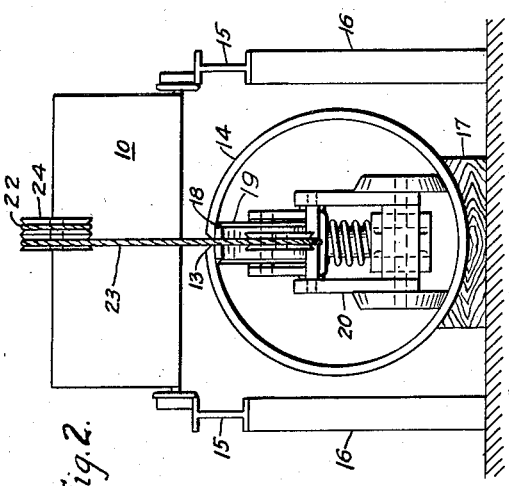
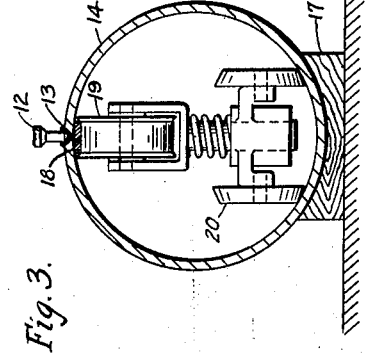
INVENTOR
Gustav H. Kock
BY
ATTORNEY Aug. 9, 1932.  G. H. KOCH  1,871,326
ARC WELDING MACHINE
Filed March 17, 1930  2 Sheets-Sheet 2
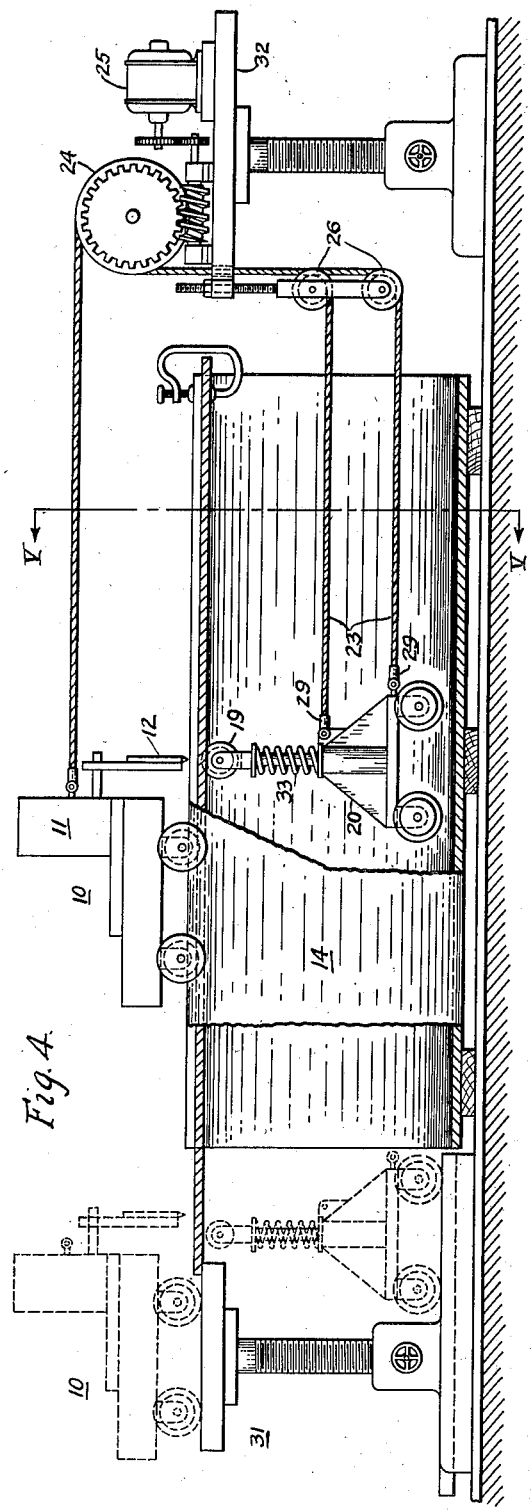
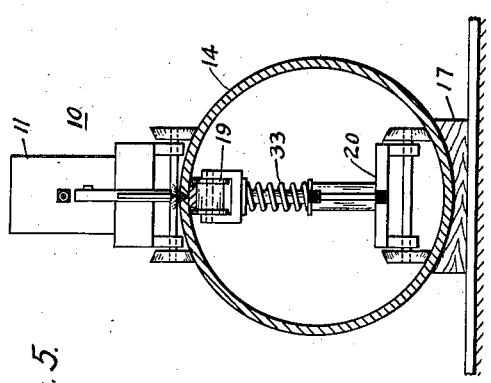
INVENTOR
Gustav H. Koch
ATTORNEY Patented Aug. 9, 1932

1,871,326

UNITED STATES PATENT OFFICE

GUSTAV H. KOCH, OF WILKINSBURG, PENNSYLVANIA, ASSIGNOR TO WESTINGHOUSE ELECTRIC & MANUFACTURING COMPANY, A CORPORATION OF PENNSYLVANIA

ARC WELDING MACHINE

Application filed March 17, 1930. Serial No. 436,422.

My invention relates, generally, to arc-welding machines and more particularly to welding machines suitable for longitudinal-seam welding of large tanks or pipes.

The object of my invention, generally stated, is to provide an arc-welding machine which shall be simple and efficient in operation and may be readily and economically manufactured.

A more specific object of my invention is to provide for automatically moving a welding electrode along a joint to perform a welding operation.

Another object of my invention is to provide for applying pressure to a backing strip, opposite the welding electrode, to cooperate in performing the welding operation.

Still another object of my invention is to provide for varying the pressure applied to the backing strip.

For a fuller understanding of the nature and objects of the invention, reference may be had to the following detailed description, taken in conjunction with the accompanying drawings, in which:

Figure 1 is a view, partly in elevation and partly in section, of a welding machine embodying my invention, and showing a cylindrical tank in position to be welded;

Fig. 2 is an end view of the apparatus illustrated in Fig. 1;

Fig. 3 is a cross-sectional view taken along the line III—III of Fig. 1;

Fig. 4 is a view, partly in elevation and partly in section, illustrating modifications of the invention, and Fig. 5 is a cross-sectional view taken along the lines V—V of Fig. 4.

Referring to the drawings, the apparatus shown in Fig. 1 comprises a carrier 10 for moving an automatic-arc-welding head 11, along the abutting edges of a cylindrical tank 14 in order to form a longitudinal seam weld at 13. The head 11 may be of any standard construction well known in the art and suitable for automatically feeding the electrode 12 during the welding operation and will not be described in detail in this specification.

It will be observed that the carrier 10 is mounted upon wheels disposed to roll on rails 15 which extend parallel to the axis of the tank 14. A rail is supported at each side of the tank on supports 16, thereby constituting a track for the carrier 10. The tank 14 is maintained in position during the welding operation by blocks 17.

In order to prevent the molten metal from running between the abutting edges of the pipe, it is necessary to provide a backing strip or chill bar 18 which is held against the opposite side of the pipe wall from that on which the welding electrode 12 is disposed. A roller 19 is provided to exert a pressure against the backing strip 18 at a point opposite the welding electrode 12. The roller 19 may be resiliently mounted on a truck 20 disposed to be drawn through the inside of the tank 14. It will be observed that the frame of the truck 20 is collapsible since it is constructed in two sections which are joined by a pin 21.

In order that the carrier 10 and truck 20 may be moved along the tank 14 during the welding operation, cables 22 and 23 are attached to the carrier 10 and truck 20, respectively. The cables 22 and 23 are driven by a sheave 24 which is rotated by a motor 25 through a worm gear drive. Guide pulleys 26 are so mounted that they will control the direction of movement of the carrier 10 and truck 20.

As shown in Fig. 1, the cable 23 is disposed in such a manner that the tension may be controlled by varying the pressure in the air cylinder 27. The pressure applied to the piston of the air cylinder 27 may be controlled by a valve 28.

It will be observed that clevises 29 are provided for attaching the cable 23 to the frame of the truck 20. As shown in Fig. 1, several holes are provided in the frame of the truck 20 for changing the position of the clevises 29 in order to vary the pressure of the roller 19 on the backing strip 18. A hook 30 is provided on one end of the cable 23 in order that the cable may be readily detached from the truck 20.

The operation of the above-described apparatus may be set forth as follows. The tank 14 may be placed on the blocks 17 with the abutting edges in the uppermost position.

The truck 20 may then be placed inside of the tank, with the roller 19 directly under the electrode 12, and the cable 23 attached to the truck by the hook 30. The backing strip 18 may be inserted in position under the abutting edges and opposite the welding electrode 12. The roller 19 may be raised to engage the backing strip by admitting air to the cylinder 27 from a pressure tank (not shown).

It can be seen that the pressure applied to the backing strip by the roller 19 may be controlled by adjusting the pressure on the air cylinder 27 by means of the valve 28 and also by changing the position of the clevises 29.

When the necessary electrical connections have been made to a welding generator or other source of power (not shown), an arc may be drawn between the edges of the tank 14 and the electrode 12 by adjusting the position of the electrode by means of the welding head 11.

By starting the motor 25, the driving sheave 24 may be rotated to move the carrier 10 and truck 20 together along the joint 13 in order to weld the entire length of the joint. It will be readily understood that, by setting the electrode and roller opposite to one another and moving them together at the same speed, the backing strip is always held tightly against the tank at the welding point and molten metal cannot flow between the abutting edges of the tank wall.

In addition the progressive action of roller 19 in synchronism with the movement of the arc-welding head 11 serves to remove any slight irregularities that may exist along the abutting edges of the pipe 14 which are to be welded together.

After the welding operation has been completed, the truck 20 may be readily removed from the inside of the tank by unhooking the cable 23. The carrier 10 may be moved to a position which will permit the tank 14 to be removed vertically and another placed in its position. The above-described welding process may then be repeated.

A modification of the apparatus illustrated in Fig. 1 is shown in Fig. 4. All parts having corresponding functions to similar parts of Fig. 1 are designated by the same reference characters.

Referring to Fig. 4, it will be observed that no track is provided for the carrier 10 which, in this embodiment of the invention, is designed to run on the exterior surface of the tank 14. A table 31, which may be adjusted both vertically and horizontally, is provided for the carrier 10 when it is not in use. An adjustable table 32 is provided for mounting the driving sheave 24 and the motor 25. The guide pulleys 26 are also mounted on the table 32.

It will be observed that, in this case, the pressure on the backing strip 18 is controlled by a spring 33, since the frame of the truck 20 is not collapsible and no means has been provided for varying the tension on the cable 23.

It will be understood that the apparatus shown in Fig. 4 may be utilized for welding tanks or large pipes of any diameter, the operation being similar to that previously described for the apparatus shown in Fig. 1.

It will also be readily understood that the pipe welding apparatus shown in the drawings is especially suitable for use in the field welding of pipe lines. Because of the construction of the apparatus and the arrangement of its parts, the welding machine, herein described, may be readily disassembled, transported to a new location and reassembled to again perform the pipe welding operation.

Since numerous changes may be made in the above-described construction and different embodiments of the invention may be made without departing from the spirit and scope thereof, it is intended that all matter contained in the above description or shown in the accompanying drawings shall be interpreted as illustrative and not in a limiting sense.

I claim as my invention:

1. In a welding machine, in combination, a carrier for moving an electrode along the abutting edges of an article to be welded, a backing strip disposed on the opposite side of the abutting edges from the electrode, a roller disposed to apply pressure to the backing strip opposite the electrode during the welding operation, a truck for supporting the roller, means for moving the electrode-carrier and said truck along the abutting edges to be welded at a predetermined rate, and means for varying the pressure applied to the backing strip.

2. In a welding machine, in combination, a carrier for moving an electrode along the abutting edges of an article to be welded, a backing strip disposed on the opposite side of the abutting edges from the electrode, a roller disposed to apply pressure to the backing strip opposite the electrode during the welding operation, a truck having a collapsible frame for supporting the roller, means for moving the electrode-carrier and said truck along the abutting edges to be welded at a predetermined rate, and means for biasing the truck frame to a position to cause the roller to apply pressure to the backing strip as it is being moved along the backing strip.

3. In a welding machine, in combination, a carrier for moving an electrode along the abutting edges of an article to be welded, a backing strip disposed on the opposite side of the abutting edges from the electrode, means for applying pressure to the backing strip during the welding operation, a cable disposed to move the electrode-carrier and the pressure-applying means together along the abutting edges to be welded, and means for driving said cable at a predetermined rate.

4. In a welding machine, in combination, a carrier for moving an electrode along the abutting edges of an article to be welded, a backing strip disposed on the opposite side of the abutting edges from the electrode, means for applying pressure to the backing strip during the welding operation, a cable disposed to move the electrode-carrier and the pressure-applying means together along the abutting edges to be welded, means for driving said cable at a predetermined rate, and means for regulating the tension on said cable to govern the pressure applied by said roller to the backing strip.

In testimony whereof, I have hereunto subscribed my name this 5th day of March, 1930.

GUSTAV H. KOCH.